US012695184B2

(12) United States Patent
Kim et al.

(10) Patent No.: US 12,695,184 B2
(45) Date of Patent: Jul. 28, 2026

(54) SIGNAL SHIELDING APPARATUS AND ANTENNA APPARATUS FOR INCLUDING THE SAME

(71) Applicant: KMW INC., Hwaseong-si (KR)

(72) Inventors: Duk Yong Kim, Yongin-si (KR); Bae Mook Jeong, Suwon-si (KR); Kyo Sung Ji, Hwaseong-si (KR); Chi Back Ryu, Hwaseong-si (KR); Won Jun Park, Yongin-si (KR); Jun Woo Yang, Hwaseong-si (KR); Seong Min Ahn, Namyangju-si (KR); Ki Hun Park, Hwaseong-si (KR); Jae Eun Kim, Suwon-si (KR)

(73) Assignee: KMW INC., Hwaseong-si (KR)

( * ) Notice: Subject to any disclaimer, the term of this patent is extended or adjusted under 35 U.S.C. 154(b) by 28 days.

(21) Appl. No.: 18/518,625

(22) Filed: Nov. 24, 2023

(65) Prior Publication Data

US 2024/0088553 A1 Mar. 14, 2024

Related U.S. Application Data

(63) Continuation of application No. PCT/KR2022/007222, filed on May 20, 2022.

(30) Foreign Application Priority Data

May 26, 2021 (KR) ........................ 10-2021-0067412
May 19, 2022 (KR) ........................ 10-2022-0061660

(51) Int. Cl.
*H01Q 1/52* (2006.01)

(52) U.S. Cl.
CPC .................................. *H01Q 1/526* (2013.01)

(58) Field of Classification Search
CPC ....... H01Q 1/246; H01Q 1/526; H05K 9/0024
See application file for complete search history.

(56) References Cited

U.S. PATENT DOCUMENTS 6,462,436 B1 10/2002 Kay et al.
8,462,520 B2 6/2013 Hsieh et al.
(Continued)

FOREIGN PATENT DOCUMENTS

CN 207927140 U 9/2018
CN 209402956 U 9/2019
(Continued)

OTHER PUBLICATIONS

Non-final Office Action mailed on Oct. 29, 2024 from the Japanese Patent Office for Japanese Application No. 2023-571175.
(Continued)

*Primary Examiner* — Thien M Le

(57) ABSTRACT

The present invention relates to a signal shielding apparatus and an antenna apparatus including same, and in particular, comprises a shield cover which is stacked and disposed on a printed board assembly (hereinafter, abbreviated to "PBA"), in which a plurality of signal-related components are mounted on one side thereof to prevent leakage of a signal from the plurality of signal-related components, wherein a grooved shield cover seating groove is formed in one surface of the PBA, and an insertion end insertably seated in the shield cover seating groove is integrally formed in the other surface from among one surface and the other surface of the shield cover, the other surface facing the one surface of the PBA, thereby providing advantages in that an increase in the manufacturing cost may be prevented, EMI shielding may be facilitated, and heat dissipation performance may be significantly improved.

20 Claims, 14 Drawing Sheets

(56) References Cited

U.S. PATENT DOCUMENTS

| | | | | |
|---|---|---|---|---|
| 9,832,859 | B2 * | 11/2017 | Lee | G06F 1/18 |
| 9,980,418 | B2 * | 5/2018 | Carpenter | H05K 9/0032 |
| 2006/0104023 | A1 * | 5/2006 | Lee | H05K 7/20972 361/679.48 |
| 2006/0134982 | A1 | 6/2006 | Zarganis et al. | |
| 2007/0279489 | A1 * | 12/2007 | Jean-Jacques | G02B 23/12 348/121 |
| 2014/0334119 | A1 | 11/2014 | Ho | |
| 2015/0116958 | A1 * | 4/2015 | Shedletsky | H05K 3/284 361/748 |
| 2017/0034963 | A1 * | 2/2017 | Cho | H05K 9/0026 |
| 2017/0181335 | A1 * | 6/2017 | Itou | H05K 1/181 |
| 2018/0316086 | A1 | 11/2018 | Lehman et al. | |
| 2019/0307029 | A1 | 10/2019 | Hannan et al. | |
| 2020/0365983 | A1 * | 11/2020 | Hwang | H01L 23/66 |
| 2023/0292445 | A1 * | 9/2023 | Landa | H05K 3/386 |
| 2024/0088553 | A1 * | 3/2024 | Kim | H01Q 1/526 |
| 2024/0290930 | A1 * | 8/2024 | Yang | H05K 7/20963 |
| 2024/0292579 | A1 * | 8/2024 | Yang | H05K 7/20963 |

FOREIGN PATENT DOCUMENTS

| | | | |
|---|---|---|---|
| CN | 110574227 | A | 12/2019 |
| EP | 1501341 | B1 | 2/2007 |
| KR | 10-0800577 | B1 | 2/2008 |
| KR | 10-2013-0038503 | A | 4/2013 |
| KR | 10-1608796 | B1 | 4/2016 |
| KR | 10-2206660 | B1 | 1/2021 |
| WO | 2018-123370 | A1 | 7/2018 |

OTHER PUBLICATIONS

European Search Report dated Apr. 4, 2025 from European Patent Office for the Application No. 22811574.7.

International Search Report mailed Aug. 29, 2022 for International Application No. PCT/KR2022/007222 and its English translation.

Chinese Office Action mailed on Mar. 31, 2026 from the State Intelleutual Property Office for Chinese Application No. 202280035578.3 and its English translation.

* cited by examiner

SIGNAL SHIELDING APPARATUS AND ANTENNA APPARATUS FOR INCLUDING THE SAME

CROSS-REFERENCE TO RELATED APPLICATIONS

This application is a continuation application of International Application No. PCT/KR2022/007222, filed May 20, 2022, which claims the benefit of Korean Patent Application Nos. 10-2021-0067412, filed May 26, 2021; and 10-2022-0061660, filed May 19, 2022, in the Korean Intellectual Property Office, the disclosures of which are incorporated herein in their entirety by reference.

TECHNICAL FIELD

The present disclosure relates to a signal shielding apparatus and an antenna apparatus including the same, and more particularly, to a signal shielding apparatus and an antenna apparatus including the same, which make it possible to easily attach and assemble a shield cover onto a printed board assembly (PBA) without a separate dispensing process.

BACKGROUND ART

A wireless communication technology, for example, a multiple-input multiple-output (MIMO) technology is a technology which can dramatically increase data transmission capacity by using a plurality of antennas, and in this technology, a transmitter transmits different data through respective transmission antennas, and a receiver adopts a spatial multiplexing technique to separate pieces of transmitted data through proper signal processing.

Accordingly, with the simultaneous increase of the number of transmission/reception antennas, the channel capacity is increased, and thus more data can be transmitted. For example, in case that the number of antennas is increased to 10, about 10 times channel capacity can be secured by using the same frequency band as compared with the current single antenna system. In case of a transmission/reception device to which such a MIMO technology is applied, the number of transmitters and filters can also be increased as the number of antennas is increased.

FIG. 1 is an exploded perspective view and a partial enlarged view of a plurality of layers of a MIMO antenna device in the related art, and FIG. 2 is a perspective view and a partial cross-sectional view illustrating an assembly of a multi band filter (MBF) between a related PCB board and an antenna substrate among constitutions of FIG. 1.

Referring to FIGS. 1 and 2, an example of a MIMO antenna device in the related art includes a main housing 10 having one side being opened and provided with a specific installation space and the other side being shielded and integrally formed with a plurality of heat dissipation pins.

In addition, the example of the MIMO antenna device in the related art further includes a printed board assembly (hereinafter, abbreviated to "PBA") 30 primarily stacked to come in close contact with one surface (lower surface in the drawing) of a bottom surface of an installation space of the main housing 10, and having the other surface on which RF feeding network related components (not illustrated) are mounted and one surface on which a plurality of multi band filters (MBFs) 40 are mounted with a shield can or shield cover 50 interposed therebetween, and an antenna board 60 secondarily stacked inside the installation space of the main housing 10, and having the other surface connected to construct specific electrical signal lines via the MBF 40 and an RF connector 43 and one surface on which a plurality of antenna elements 65 are mounted.

Here, the shield can or shield cover 50 is interposed between the PBA 30 and the MBF 40, and performs a signal shielding function not to exert an influence on the electrical signal line constructed in the MBF 40 by blocking interferences of electromagnetic waves and/or signals generated from electrical components (e.g., RF feeding network related components (not illustrated)) mounted on the PBA 30.

However, on the point that one surface of the PBA 30 on which a plurality of RF feeding network components are mounted and the MBF 40 should be provided to energize each other, as being referenced in FIG. 1, at least one case extension part 45, into which an RF connector 43 is inserted, may be provided on the MBF 40, and at least one through-hole 55 that is penetrated by the case extension part 45 may be formed on the shield can or shield cover 50.

However, the MIMO antenna device in the related art is manufactured in a state where the thickness of the main housing 10 is minimized due to the slimming trend of the product, and accordingly, internal components (e.g., resonance component (not illustrated) of the MBF 40 are arranged in one row in a horizontal direction, so that an internal space in a cavity is narrowed, and thus the skirt characteristic (i.e., Q value) is reduced.

Further, the MBF 40 is a representative heat generation element that generates a large amount of heat in a frequency filtering process, and the heat generated from the MBF 40 is transferred to one surface side of the PBA 30 via the shield can or shield cover 50 or through the shield cover 50, and then is smoothly dissipated through the plurality of heat dissipation fins 15 in order to improve the filter performance of the MBF 40.

More specifically, a transceiver of a type, such as a MIMO antenna apparatus, may have a poor quality of a communication signal due to electromagnetic interference (EMI) or radio frequency interference (RFI). Accordingly, in the PBA 30 including a PCB of the transceiver, the above-described shield can or shield cover 50 may be generally used to reduce the electromagnetic interference (EMI) or the radio frequency interference (RFI).

The shield can or shield cover 50 is installed on one surface of the PCB, and performs the signal shielding function to block the interferences of the electromagnetic waves and/or signals generated from the electrical components (e.g., RF feeding network related components) mounted on the PBA 30.

However, the shield can or shield cover 50, when being attached to the one surface of the PBA 30, performs the above-described signal shielding function by applying a predetermined dispensing process (EMI shield gasketing material) so as to surround components, such as an AMF and an RF line, which require EMI shielding.

However, the shield can or shield cover 50 in the related art has a problem in that the dispensing process for attachment to the PBA 30 is performed after passing through casting and post-processing, and thus the cost is greatly increased.

Further, the shield can or shield cover 50 in the related art has a problem in that it is coupled to the PBA 30 after a predetermined adhesive material is first applied to the one surface of the PBA 30 in the dispensing process, and thus the heat dissipation toward the shield can or shield cover 50 is limited due to the high heat resistance.

DISCLOSURE

Technical Problem

The present disclosure has been devised to solve the above-described problem, and an object of the present disclosure is to provide a signal shielding apparatus which prevents the manufacturing cost from being increased, and includes a shield cover that facilitates EMI shielding, and an antenna apparatus including the signal shielding apparatus.

In addition, another object of the present disclosure is to provide a signal shielding apparatus which can greatly improve the heat dissipation performance by deleting a dispensing process that mediates an adhesive material and securing a blocked heat dissipation path by the adhesive material, and an antenna apparatus including the signal shielding apparatus.

The technical problems of the present disclosure are not limited to the above-described technical problems, and other unmentioned technical problems may be clearly understood by those skilled in the art from the following descriptions.

Technical Solution

A signal shielding apparatus according to one embodiment of the present disclosure includes: a shield cover stacked and disposed on one surface of a printed board assembly (hereinafter, abbreviated to "PBA") having one surface on which a plurality of signal-related components are mounted, and configured to prevent leakage of signals from the plurality of signal-related components, wherein a grooved shield cover seating groove is formed on one surface of the PBA, and an insertion end part inserted and seated onto the shield cover seating groove is integrally formed on the other surface of the shield cover having one surface and the other surface, the other surface of the shield cover facing the one surface of the PBA.

Here, the insertion end part may be formed with a step height so that the entire insertion end part is accommodated in a groove shape of the shield cover seating groove.

Further, a front end surface of the insertion end part may be spaced apart for a predetermined distance from a bottom surface of the shield cover seating groove when a region formed with the step height comes in contact with an outer surface of the shield cover seating groove.

Further, the insertion end part may have a front end of which the surface is supported by the shield cover seating groove, but a side part may be formed to be inclined so that the side part becomes larger than a formation width of the shield cover seating groove as being spaced apart from the bottom surface of the shield cover seating groove.

Further, the shield cover seating groove and the insertion end part of the shield cover may be formed in a closed loop shape so as to surround constituent elements requiring EMI shielding therein.

Further, the constituent elements requiring the EMI shielding may include amplification-related elements and RF feeding related components coupled to the PBA.

Further, the insertion end part may be formed to extend for a predetermined length from the other surface of the shield cover toward a bottom surface of the shield cover seating groove.

Further, an inner surface of the shield cover seating groove may be covered by any one of a material facilitating electromagnetic wave blocking or a thermally conductive material.

Further, the insertion end part of the shield cover may be formed to correspond to a shape of a shield cover wall formed to reinforce the shield cover.

Further, the insertion end part of the shield cover and an outer surface of the shield cover wall may be covered by any one of a material facilitating electromagnetic wave blocking or a thermally conductive material.

Further, the shield cover seating groove may be formed to have a horizontal cross section corresponding to a shape of a shield cover wall formed to reinforce the shield cover.

Further, the shield cover seating groove may be formed to have a "ㄴ"-shaped cross section.

An antenna apparatus including a signal shielding apparatus according to one embodiment of the present disclosure includes: an antenna housing part formed in a cuboidal enclosure shape having an open front; a printed board assembly (PBA) stacked and disposed in an inner space of the antenna housing part; a filter module stacked and disposed in front of the PBA; and a radiation element module stacked and disposed in front of the filter module, wherein a shield cover stacked and disposed on one surface of the PBA on which a plurality of signal-related components are mounted and configured to prevent leakage of signals from the plurality of signal-related components is further provided between the PBA and the filter module, and an insertion end part inserted and seated onto a shield cover seating groove formed on one surface of the PBA in a groove shape is integrally formed on the other surface of the shield cover having the one surface and the other surface, the other surface of the shield cover facing the one surface of the PBA.

Advantageous Effects

The signal shielding apparatus according to an embodiment of the present disclosure can achieve an effect of not only enabling more effective shielding but also preventing an increase of the manufacturing cost in attaching the shield cover to the components requiring the EMI shielding on one surface of the PBA even without a separate dispensing process.

Further, since the adhesive material having been used to couple the shield cover in the related art to one surface of the printed board assembly (PBA) is deleted, the present disclosure can achieve an effect of greatly improving the heat dissipation performance through enabling of the heat dissipation through the entire of one surface and the other surface of the PBA.

EXPLANATION OF SYMBOLS

Figure 1:
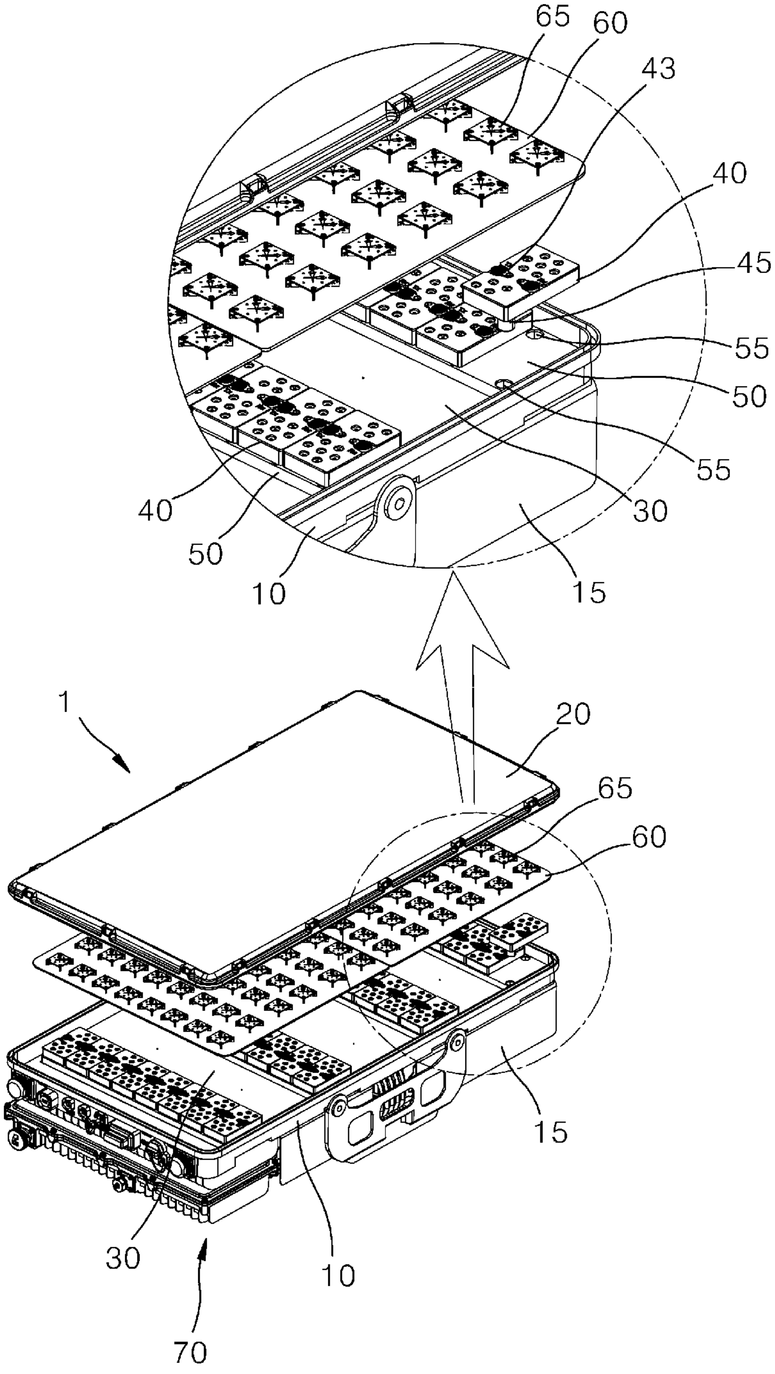
FIG. 1 is an exploded perspective view and a partial enlarged view illustrating a plurality of layers of a MIMO antenna device in the related art.
Figure 2:
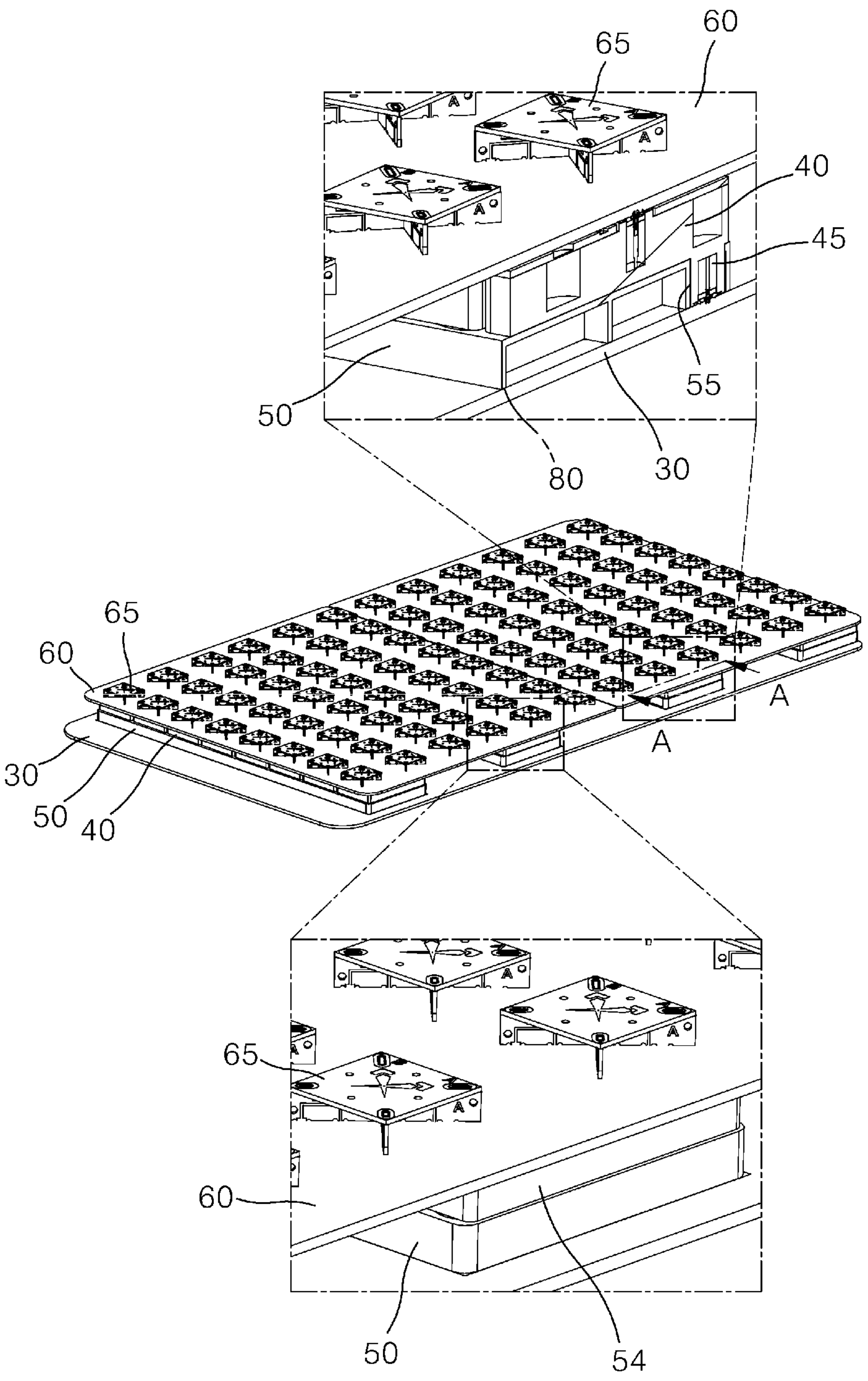
FIG. 2 is a perspective view and a partial cross-sectional view illustrating a multi band filter (MBF) assembly between a related PCB board and an antenna substrate among the constitutions of FIG. 1.

100: antenna apparatus
200: antenna housing part
201: plural heat dissipation fins
250: handle
300: PBA
310: PA board
320: DTA board
330: PSU board
340: external board
350: cable
380: shield cover seating groove
400: filter module
410: first filter part
420: second filter part
500: shield cover
510*a*, 510*b*: insertion end part
511: shield cover wall
513: front end part
600: radiation element module
610: reflecting panel
620: plural feeding lines
630: radiation element
700: radome panel
710: plural fixing clips
720: support boss

MODE FOR INVENTION

Hereinafter, a signal shielding apparatus and an antenna apparatus including the same according to an embodiment of the present disclosure will be described in detail with reference to the exemplary drawings.

In adding reference numerals to constituent elements in the drawings, it is to be noted that the same constituent elements have the same reference numerals as much as possible even if they are represented in different drawings. Further, in explaining embodiments of the present disclosure, the detailed explanation of related known constitutions or functions will be omitted if it is determined that the detailed explanation interferes with understanding of the embodiments of the present disclosure.

The terms, such as “first, second, A, B, (a), and (b)”, may be used to describe constituent elements of embodiments of the present disclosure. The terms are only for the purpose of discriminating one constituent element from another constituent element, but the nature, the turn, or the order of the corresponding constituent elements is not limited by the terms. Further, unless otherwise defined, all terms (including technical and scientific terms) used herein have the same meanings as those commonly understood by those ordinary skilled in the art to which the present disclosure belongs. The terms that are defined in a generally used dictionary should be interpreted as meanings that match with the meanings of the terms from the context of the related technology, and they are not interpreted as an ideal or excessively formal meaning unless clearly defined in the present disclosure.

Figure 3:
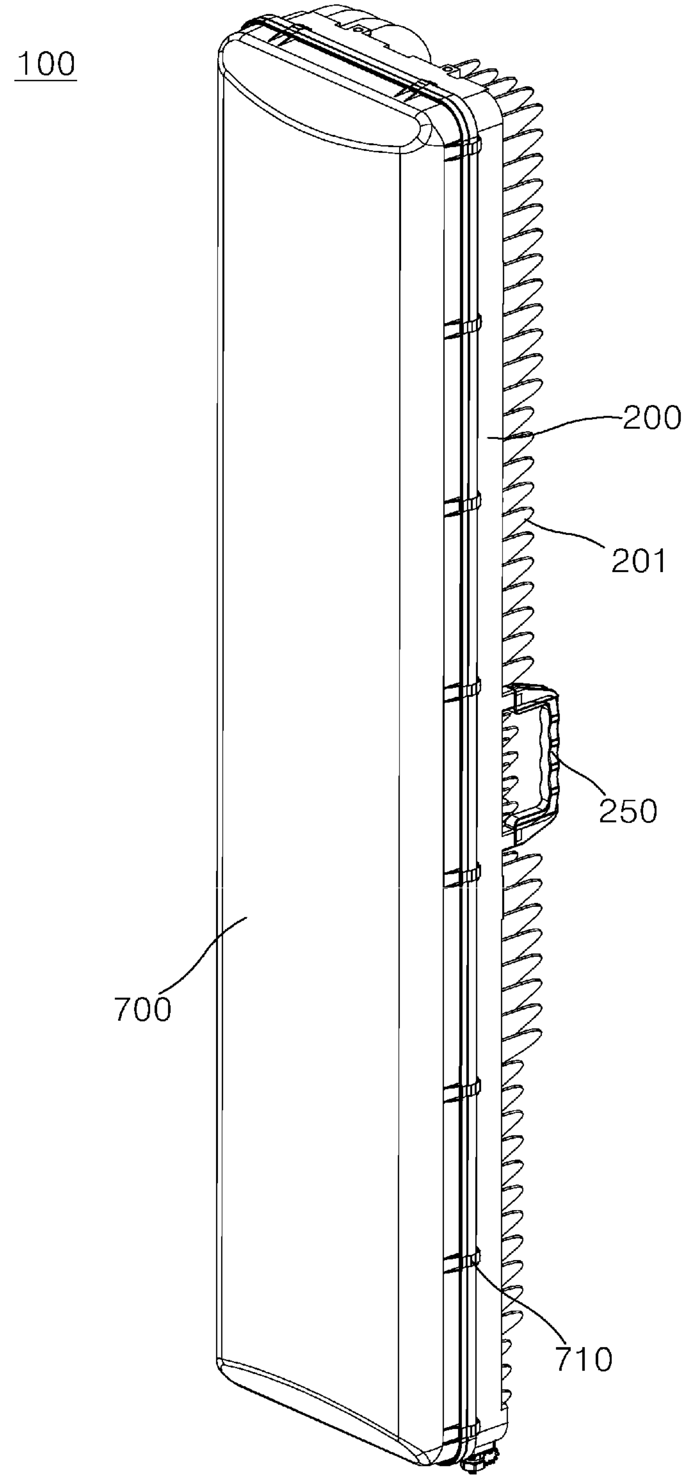
FIG. 3 is a perspective view illustrating an external appearance of an antenna apparatus including a signal shielding apparatus according to an embodiment of the present disclosure.
Figure 4A:
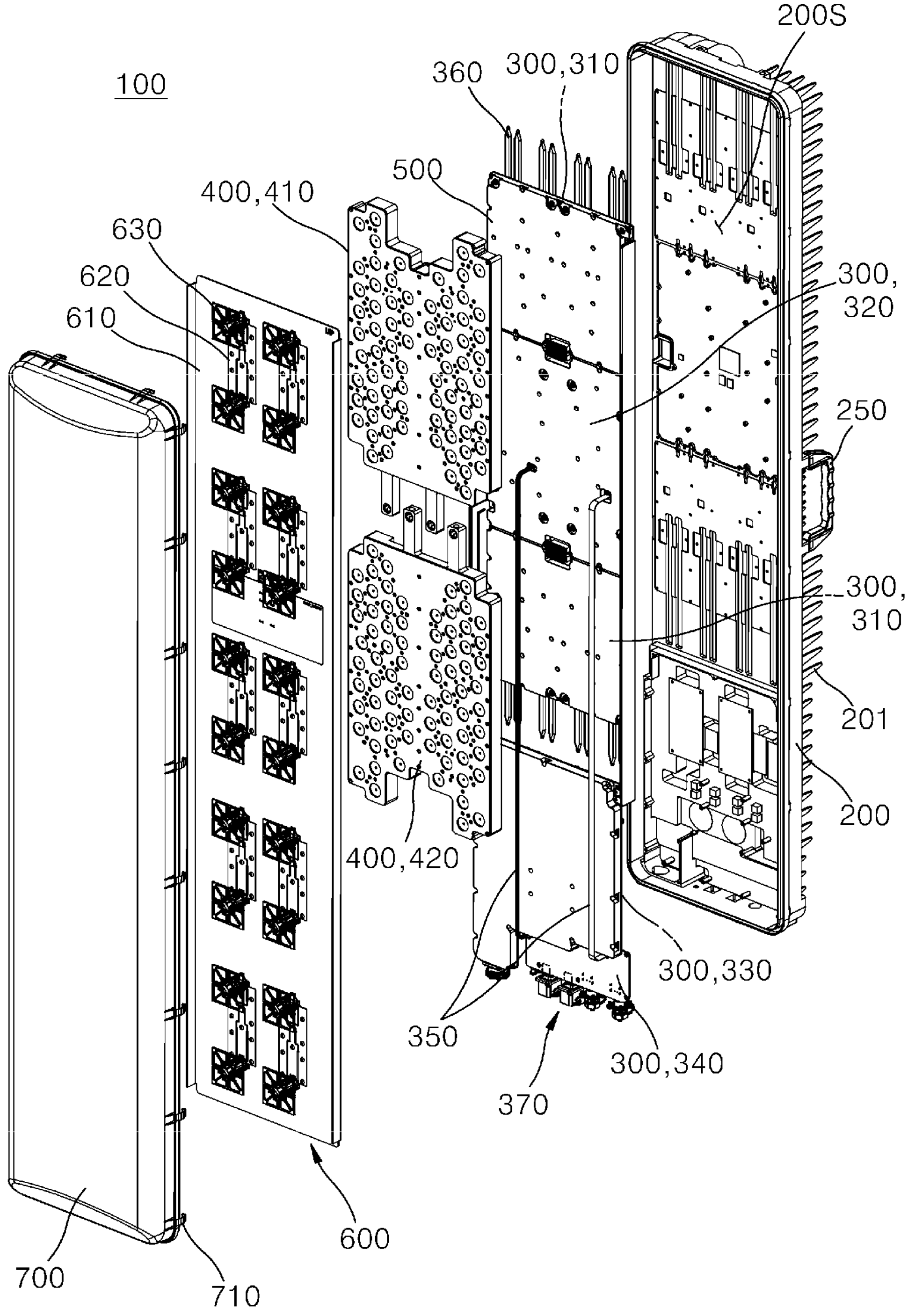
FIGS. 4A and 4B are exploded perspective views of FIG. 3 in backward and forward directions.
Figure 4B:
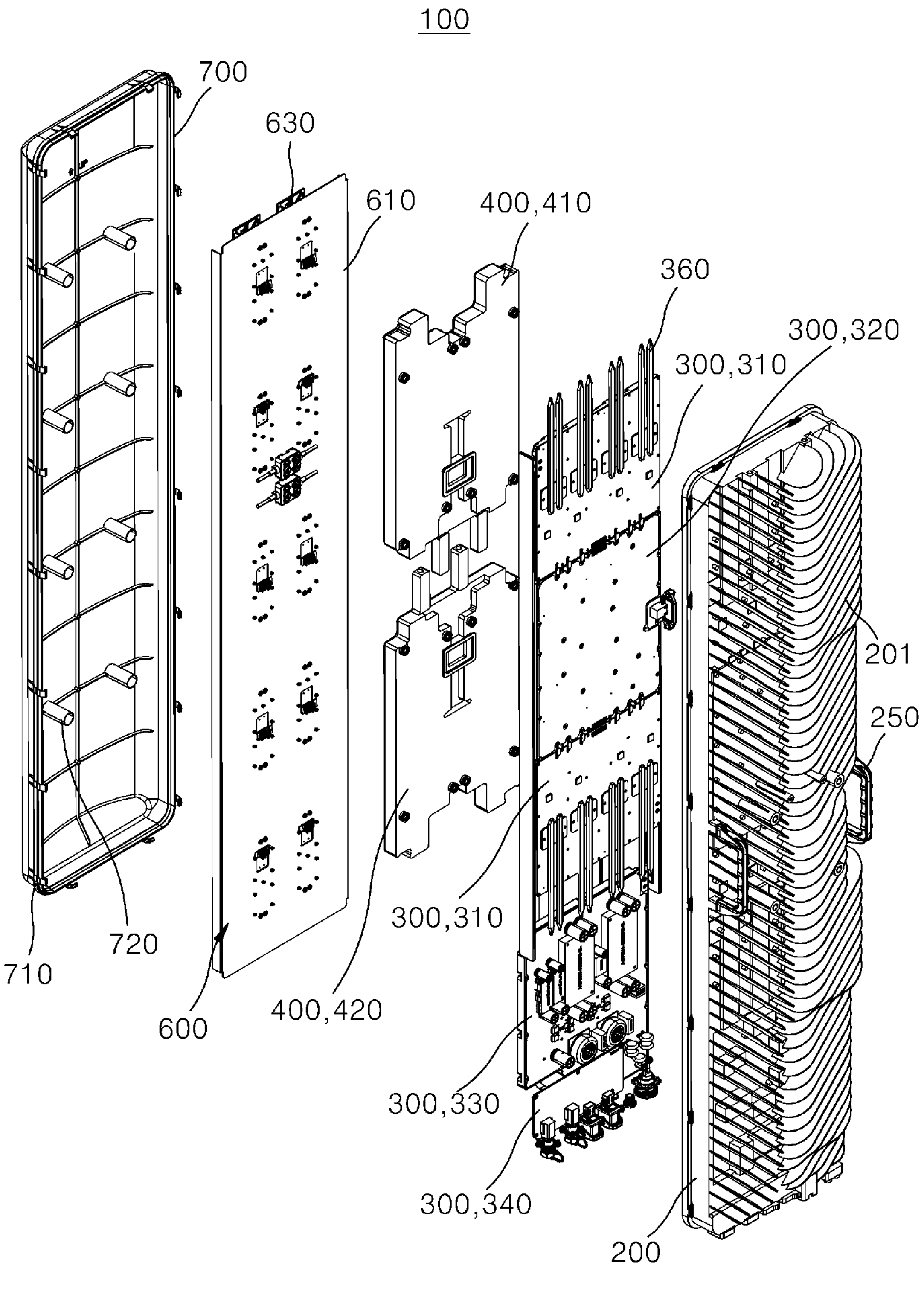
Figure 5A:
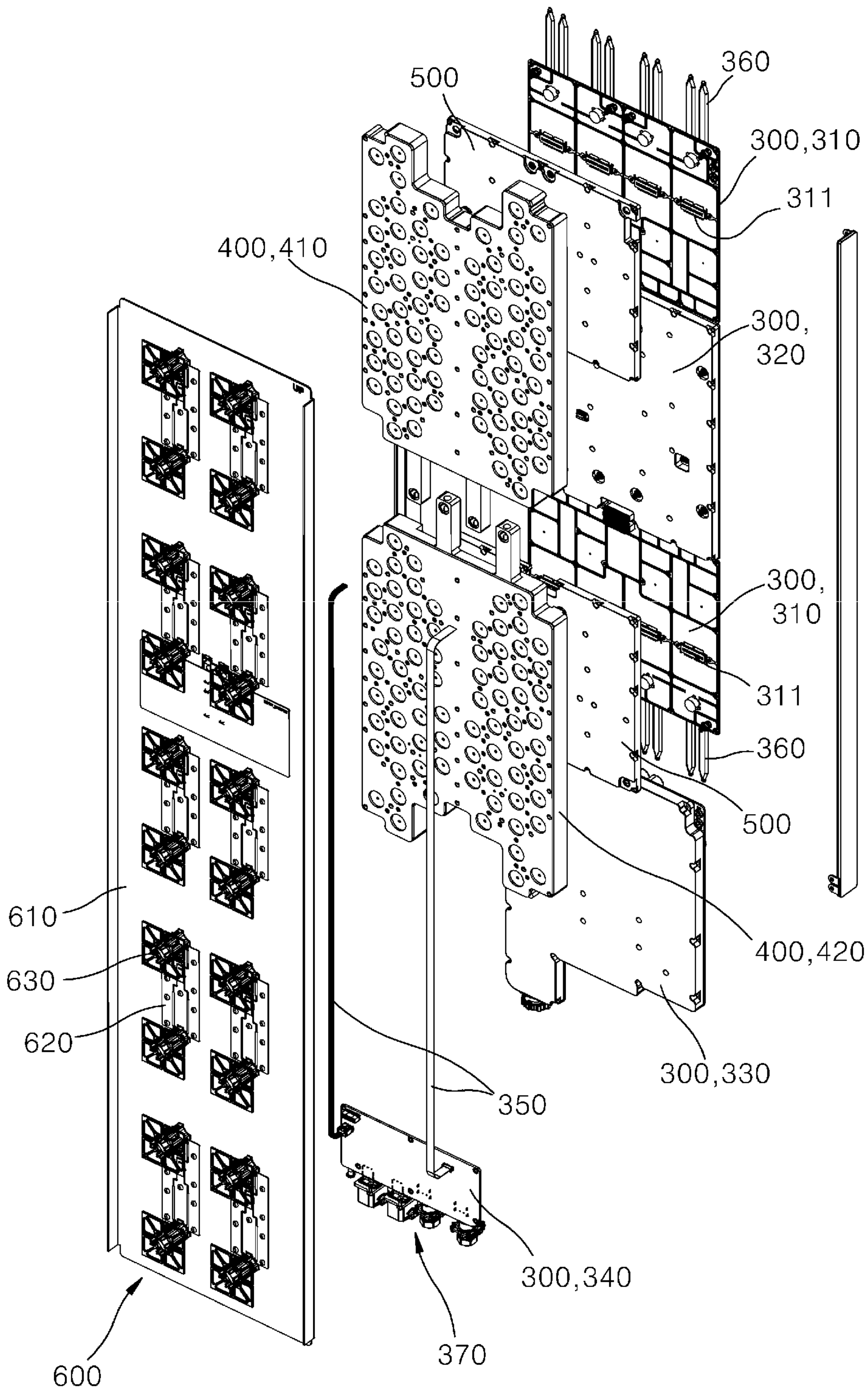
FIGS. 5A and 5B are exploded perspective views in backward and forward directions, illustrating a PBA module, a filter module, and a radiation element module among the constitutions of FIG. 3.
Figure 5B:
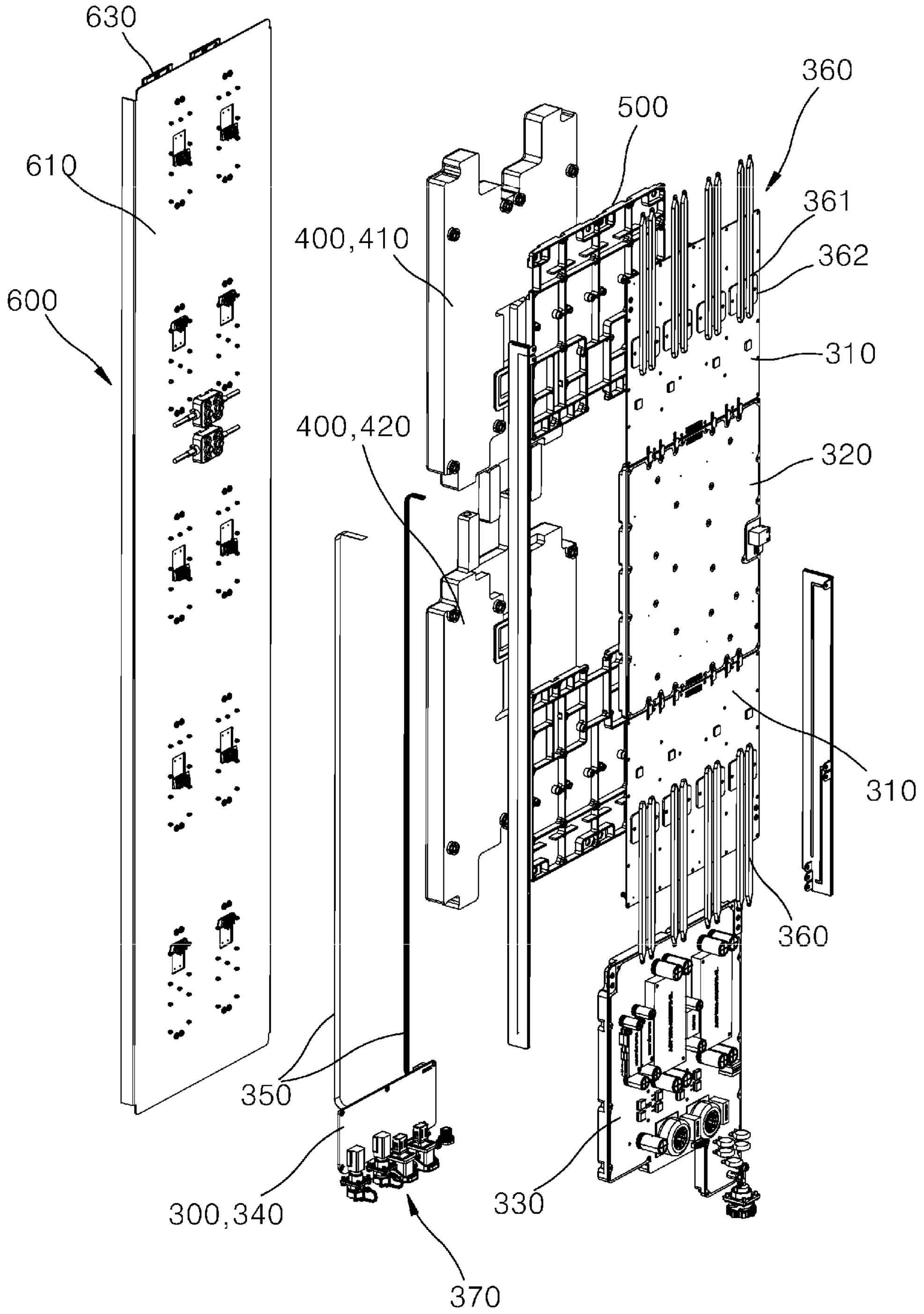

FIG. 3 is a perspective view illustrating an external appearance of an antenna apparatus including a signal shielding apparatus according to an embodiment of the present disclosure. FIGS. 4A and 4B are exploded perspective views of FIG. 3 in backward and forward directions, and FIGS. 5A and 5B are exploded perspective views in backward and forward directions, illustrating a PBA module, a filter module, and a radiation element module among the constitutions of FIG. 3.

As referenced in FIGS. 3 to 5B, an antenna apparatus 100 according to an embodiment of the present disclosure may include: an antenna housing part 200 formed in a cuboidal enclosure shape formed long up and down and having an open front; a printed board assembly (hereinafter, abbreviated to “PBA”) 300 stacked and disposed in close contact with an inner space 200S of the antenna housing part 200; a filter module 400 stacked and disposed in front of the PBA 300; and a radiation element module 600 stacked and disposed in front of the filter module 400.

The antenna housing part 200 is made of a metal material (or conductive material), and may serve to protect components (PBA 300, filter module 400, and radiation element module 600) accommodated in an inner space 200S together with a radome 700 to be described later from outside, and to dissipate internal heat being generated during the system operation of the antenna apparatus 100 to the outside.

For this, it is preferable that the antenna housing part 200 is made of a metal material having high thermal conductivity, and on a rear surface part of the antenna housing part 200, a plurality of heat dissipation fins 201 may be integrally formed so as to increase a heat dissipation surface area.

In addition, on a center portion of left and right both end parts of the antenna housing part 200, a handle part 250 that can be grasped by a worker’s hand may be formed to facilitate worker’s transport and installation of the antenna apparatus at an installation site.

As referenced in FIGS. 4A and 4B, the PBA 300 may include a PA board 310 located to be relatively branched into an upper part and a lower part on the same layer, a DTA board 320 disposed to form the same layer between the PA boards 310 branched into the upper part and the lower part, a PSU board 330 disposed to form the same layer on the lower side of the lower PA board 310, and an external board 340 disposed to form a different layer on the lower side of the PSU board 330.

The DTA board 320 and the external board 340 may be electrically connected to each other through an OPTIC cable and an FCC cable 350, and an external mounting member 370 may be coupled to the external board 340.

On at least one of one surface and the other surface of the PA board 310 and the DTA board 320, amplification-related elements, such as a PA element or an LNA element, and RF feeding-related components (hereinafter, collectively referred to as a “PBA element” and indicated by a reference numeral “311” as a representative reference numeral) may be mounted and disposed, and on at least the rear surface part of the PA board 310, a plurality of heat transfer modules 360 may be disposed to transfer the operation heat generated from the PBA element 311 toward the rear surface of the antenna housing part 200.

The heat transfer module 360 may include a thermal pad 362 disposed so that at least a part thereof comes in direct contact with an outer surface of the PBA element 311 and configured to capture the heat from the PBA element 311, and a plurality of heat pipes 361 having one end part connected to the thermal pad 362 and the other end part connected to be in close contact with an inner surface of the antenna housing part 200, and having a refrigerant fluid built therein and configured to cause a phase change depending on the temperature.

Meanwhile, as referenced in FIGS. 4A to 5B, the filter module 400 may be stacked and disposed in front of the PBA 300 so as to be electrically connected to the PBA 300 pre-stacked and disposed in the inner space 200S.

Here, the filter module 400 is a constituent element for filtering a specific frequency band signal, and although not illustrated in the drawing, the filter module may be adopted as a cavity filter in which a plurality of cavities are provided in a filter body made of a dielectric material and a resonance bar that serves as a resonator and a resonance bar tuning screw are provided in each of the cavities.

The filter module 400 may include a first filter part 410 provided relatively on an upper part and a second filter part 420 provided relatively on a lower part.

Meanwhile, as referenced in FIGS. 4A to 5B, the radiation element module 600 may include a reflecting panel 610 provided in a panel shape, a plurality of feeding lines 620 disposed on a front surface of the reflecting panel 610, and a plurality of radiation elements 630 connected to the plurality of feeding lines 620. The plurality of radiation elements 630 may be adopted as any one of a patch type or a dipole type, and in an embodiment of the present disclosure, as referenced in the drawing, the radiation elements 630 may be provided as the dipole type.

As described above, a radome panel 700 may be fixed to the PBA 300, the filter module 400, and the radiation element module 600, being stacked in the inner space 200S of the antenna housing part 200 through a plurality of fixed clips 710 on a front end border portion of the antenna housing part 200 to shield the front part of the open antenna housing part 200, and thus can protect internal constituent elements from the outside. Here, on the rear surface part of the radome panel 700, a plurality of support bosses 720 are provided, so that the reflecting panel 610 of the radiation element module 600 can be firmly and stably assembled and fastened through assembly screws (not illustrated).

Figure 6:
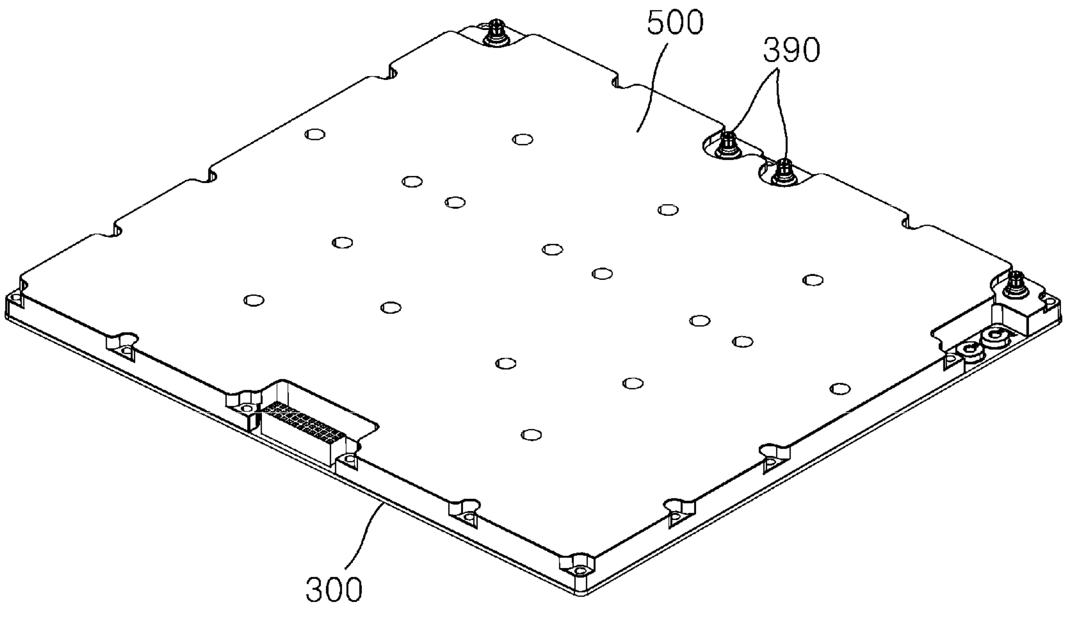
FIG. 6 is a perspective view illustrating a PBA and a shield cover among constitutions of a signal shielding apparatus according to an embodiment of the present disclosure.
Figure 7:
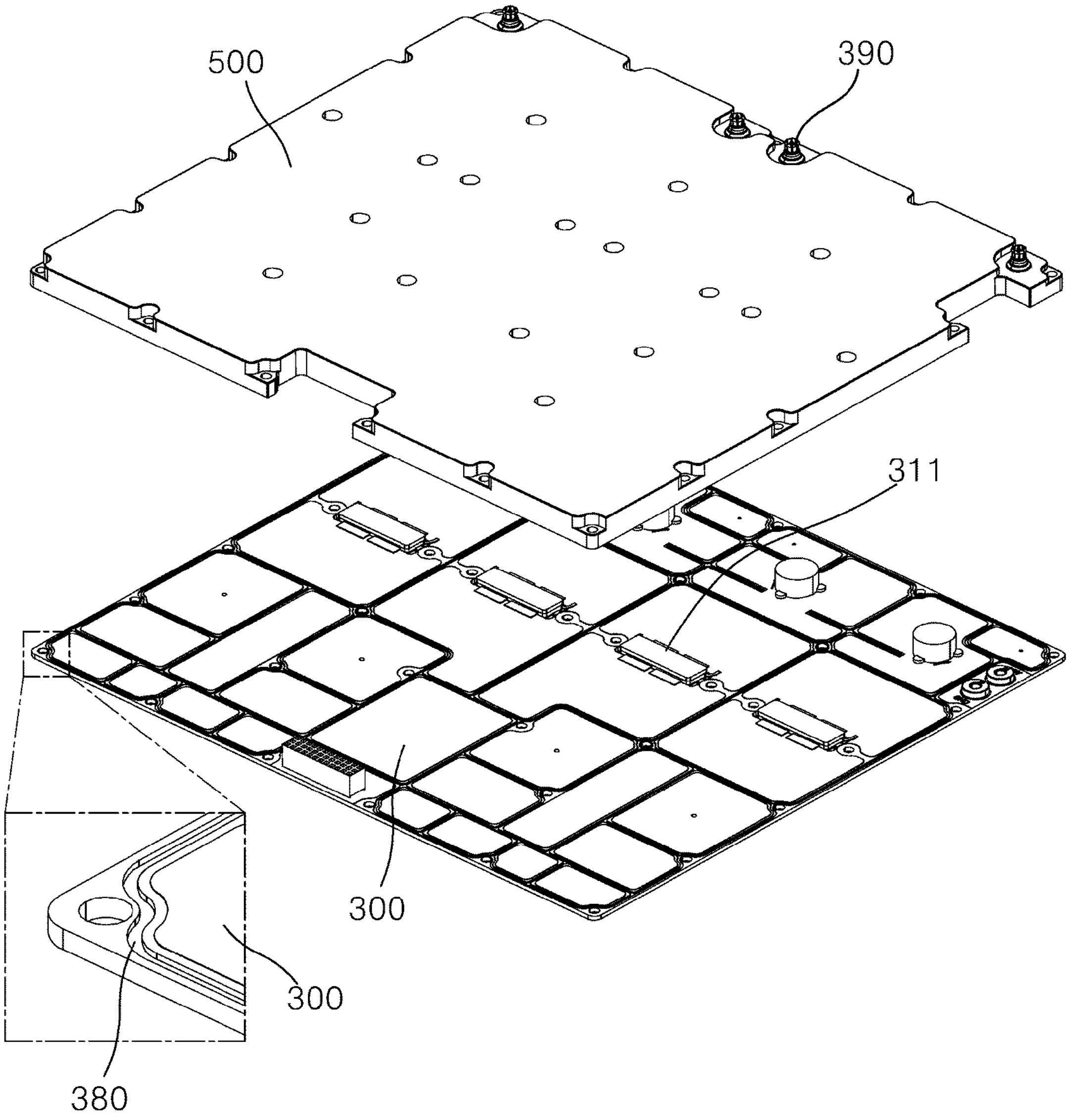
FIGS. 7 and 8 are an exploded perspective view and its partial enlarged view of FIG. 6.
Figure 8:
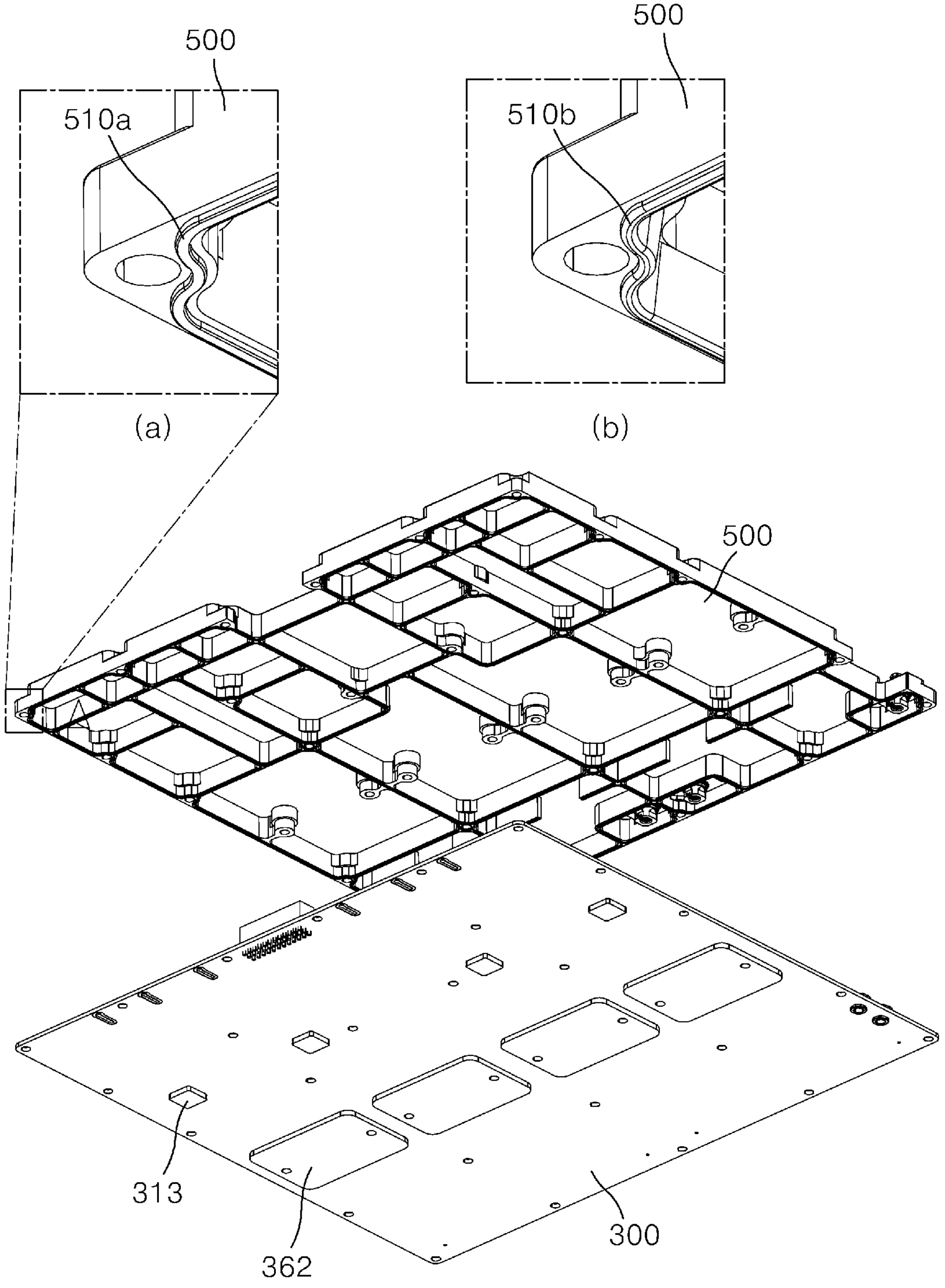

FIG. 6 is a perspective view illustrating a PBA and a shield cover among constitutions of a signal shielding apparatus according to an embodiment of the present disclosure, and FIGS. 7 and 8 are an exploded perspective view and its partial enlarged view of FIG. 6.

The signal shielding apparatus according to an embodiment of the present disclosure includes a PBA 300 primarily stacked on an inside of the inner space 200S of the antenna housing part 200 formed in a cuboidal enclosure shape having a front and rear accommodation width that is long and thin in a roughly up and down direction to form an open accommodation space in the front (upper side in the drawing). Referring to FIG. 7, a plurality of signal-related components (PBA elements 311) may be mounted so as to penetrate one surface (lower surface in the drawing) of the PBA 300 or the PBA 300.

On one surface of the PBA 300, a shield cover 500 may be provided as a constitution according to an embodiment of the present disclosure that is provided to shield an external noise (signal caused by electromagnetic waves). The shield cover 500 may have a clamshell shape. This is caused by a case where the shield cover 500 covers the front surface of the PBA 300, and the remaining region excluding insertion end parts 510*a* and 510*b* to be described later is formed to be spaced apart from the front surface of the PBA 300.

As referenced in FIG. 7, on one surface of the PBA 300, a shield cover seating groove 380, into which the insertion end parts 510*a* and 510*b* of the shield cover 500 are inserted, may be formed to be engraved in a groove form. The PBA 300 may be formed as a multilayer, and the shield cover seating groove 380 may be formed by processing a part of a ground layer of the multilayer.

Here, it is preferable that the shield cover seating groove 380 is formed to be engraved in the shape corresponding to the shape of the insertion end parts 510*a* and 510*b* of the shield cover 500 so that the front end of the shield cover 500 is inserted and comes in contact therewith.

Further, the shield cover seating groove 380 is provided so that the insertion end parts 510*a* and 510*b* of the shield cover 500 are inserted therein, and may also serve to set the installation location on one surface of the PBA 300 of the shield cover 500.

More specifically, the shield cover seating groove 380 may be formed so that the front end of the shield cover 500 is seated therein and an upper part of the shield cover seating groove 380 has an open "ㄷ"-shaped horizontal cross section so as to come in contact with a par of the side part adjacent to the front end of the shield cover 500.

Here, in case that the insertion end parts 510*a* and 510*b* of the shield cover 500 to be described later are inserted into the shield cover seating groove 380 formed to have the "ㄷ"-shaped horizontal cross section as described above, the step surface of the insertion end part (i.e., insertion end part 510*a* according to the second embodiment to be described later) formed with a step height or an outer surface of the insertion end part (i.e., insertion end part 510*b* according to the second embodiment to be described later) formed to be inclined may be locked in or accommodated in contact with an outer front end of the shield cover seating groove 380.

Figure 9:
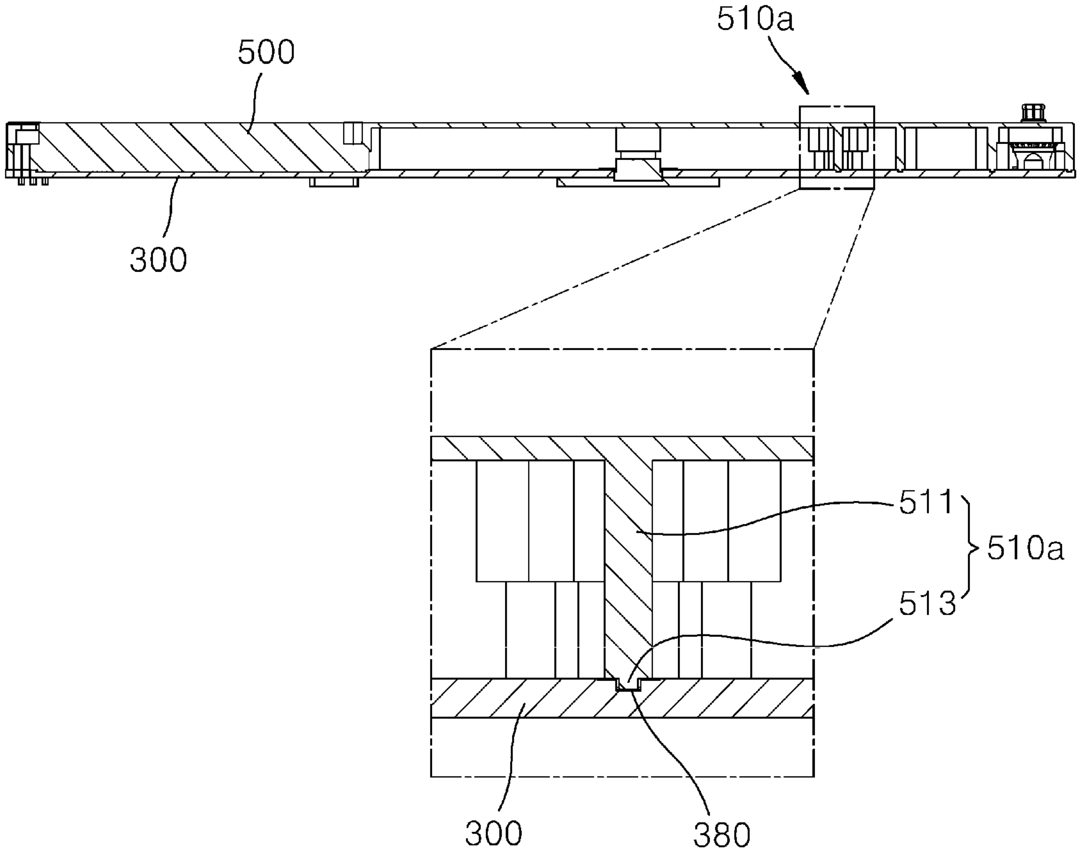
FIGS. 9 and 10 are a cross-sectional view and a cutaway perspective view in which a shield cover according to a first embodiment is applied among constitutions of a signal shielding apparatus according to an embodiment of the present disclosure.
Figure 10:
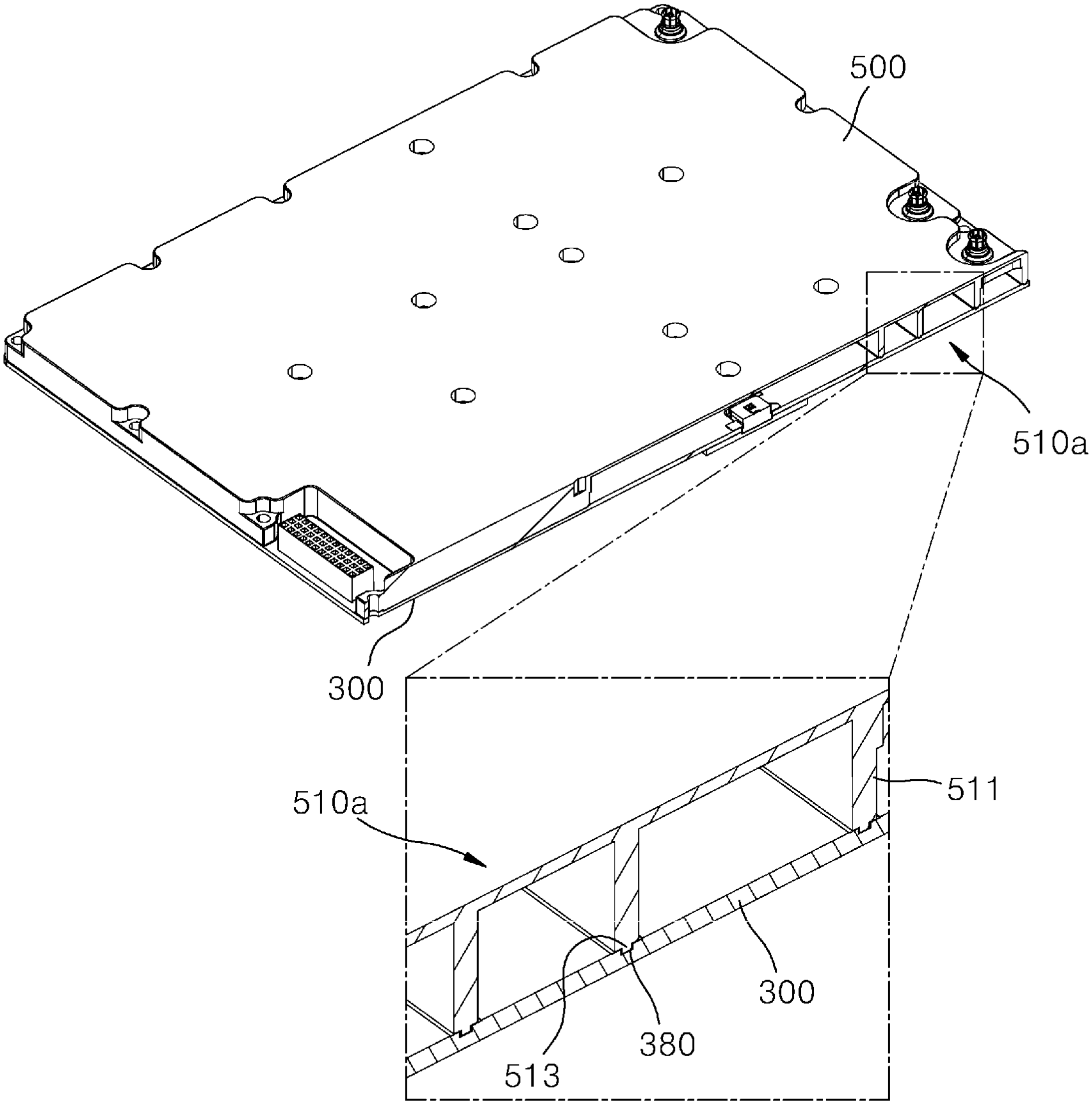
Figure 11:
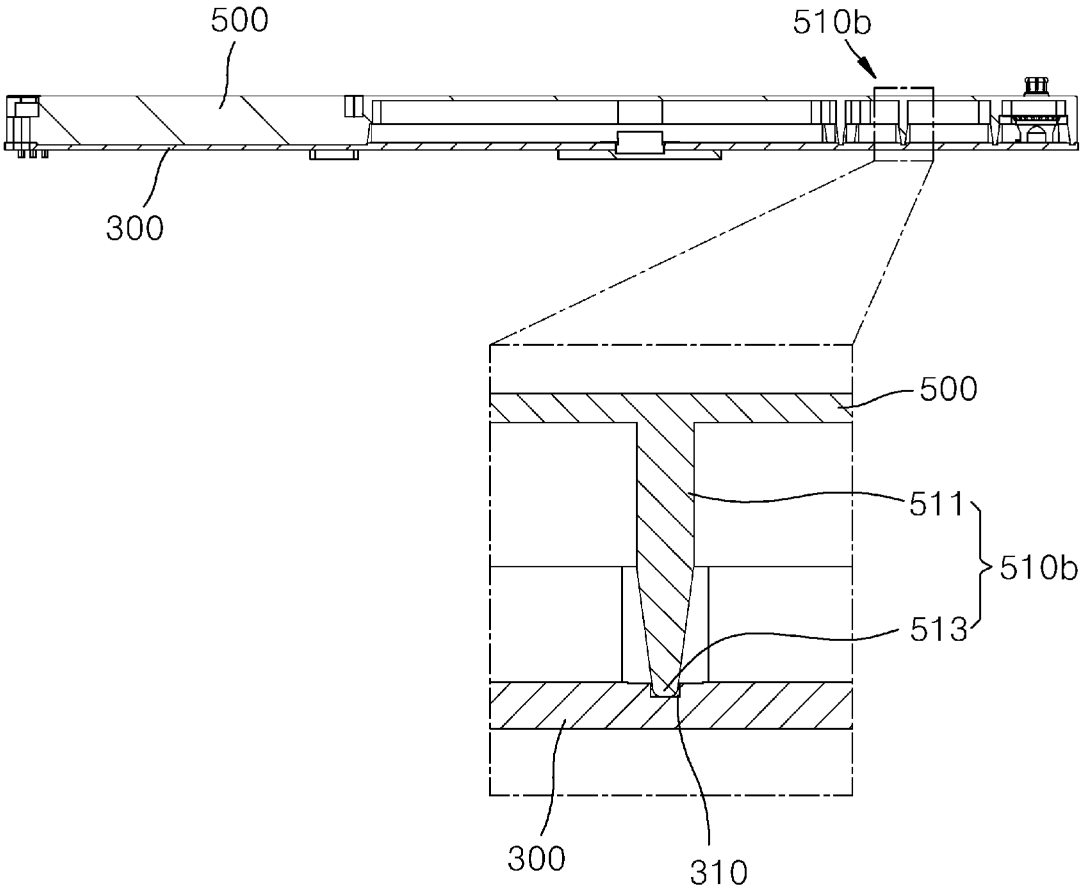
FIGS. 11 and 12 are a cross-sectional view and a cutaway perspective view in which a shield cover according to a second embodiment is applied among constitutions of a signal shielding apparatus according to an embodiment of the present disclosure.
Figure 12:
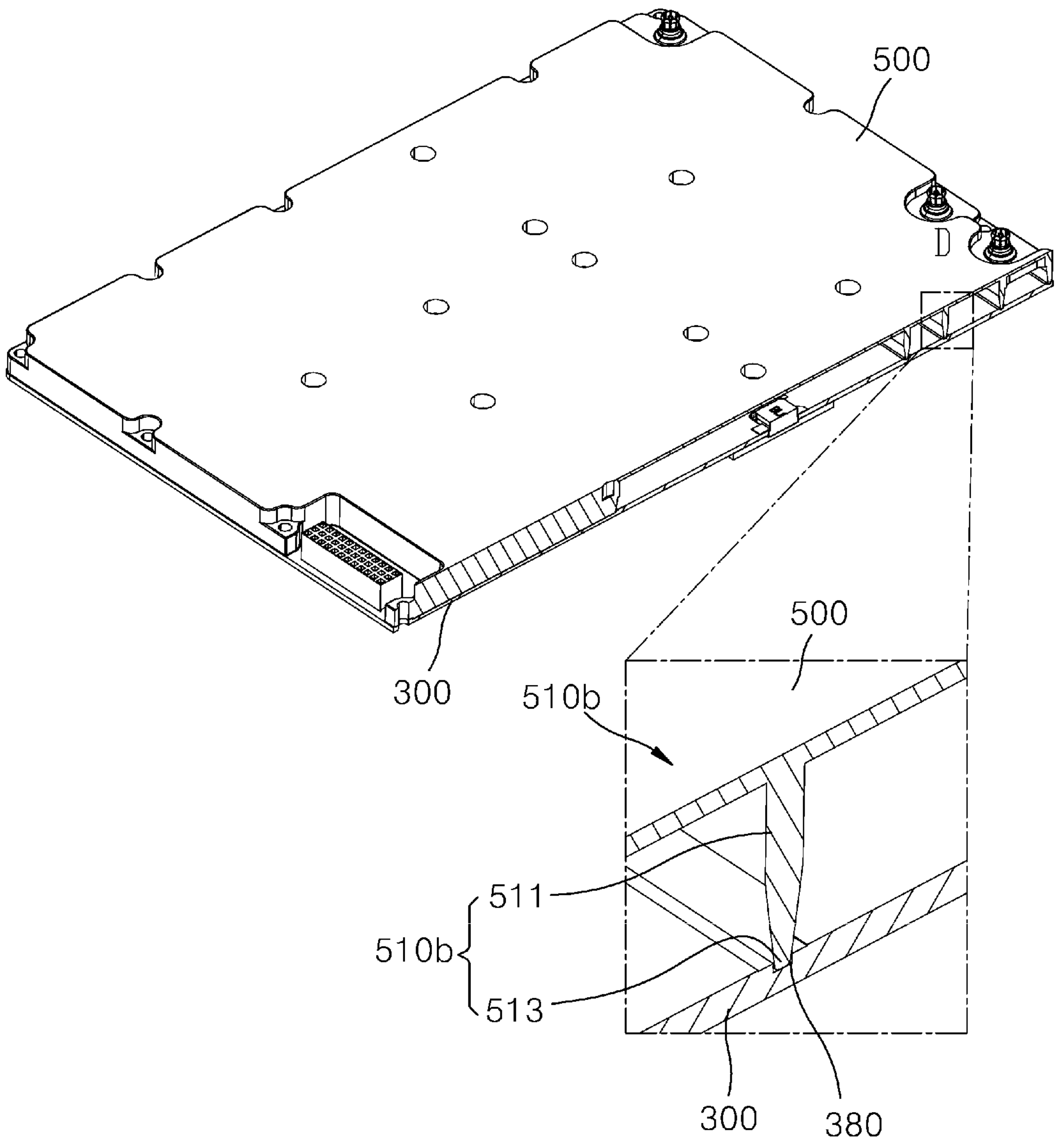

FIGS. 9 and 10 are a cross-sectional view and a cutaway perspective view in which a shield cover according to a first embodiment is applied among constitutions of a signal shielding apparatus according to an embodiment of the present disclosure, and FIGS. 11 and 12 are a cross-sectional view and a cutaway perspective view in which a shield cover according to a second embodiment is applied among constitutions of a signal shielding apparatus according to an embodiment of the present disclosure.

The insertion end parts 510*a* and 510*b* of the shield cover 500 may be adopted as any one of the insertion end part 510*a* according to the first embodiment formed with a step height so as to be fitted and seated into the groove shape of the shield cover seating groove 380 as referenced in FIGS. 9 and 10, and the insertion end 510*b* according to the second embodiment formed to be inclined so that the surface of the front end is supported by a bottom surface of the shield cover seating groove 380 and the side part becomes larger than a formation width of the shield cover seating groove 380 as being spaced apart from the shield cover seating groove 380.

Here, the insertion end parts 510*a* and 510*b* of the shield cover 500 may be formed to correspond to the shape of a shield cover wall 511 already formed on the rear surface of the shield cover 500 so as to reinforce the shield cover 500. That is, the insertion end parts 510*a* and 510*b* of the shield cover 500 may be a region that is integrally formed with the shield cover 500 and the shield cover wall 511 by a molding forming method, or may be a portion formed by processing the stepped part of the shield cover wall 511 after first forming and producing the shield cover 500 and the shield cover wall 511.

The shield cover wall 511 may be formed on the other surface of the shield cover 500 including one surface and the other surface, which faces one surface of the PBA 300, in a closed loop shape having a plurality of lattice patterns, and the shield cover wall 511 may accommodate therein signal-related components requiring EMI shielding.

Here, the constituent elements that require EMI shield therein may include amplification-related elements (PA element or LNA element) coupled to the PBA 300 and RF feeding-related components (RF lines).

Ultimately, the shield cover 500 may serve to prevent electromagnetic signal interferences between the constituent elements mounted on or coupled to the PBA 300 and requiring the EMI shielding and the filter module 400 stacked and disposed in front of the constituent elements so as to form the different layers.

Meanwhile, as referenced in FIGS. 9 and 10, the insertion end part 510*a* of the shield cover 500 according to the first embodiment may include a front end part 513 formed to extend with a step height from the end part of the shield cover wall 511 of the shield cover 500 toward one surface of the PBA 300, and the front end part 513 may be formed to be smaller than the width of the shield cover seating groove 380 formed on the one surface of the PBA 300.

Here, since the front end of the shield cover wall 511 (i.e., stepped boundary surface on the front end part 513 of the insertion end part 510*a*) comes in contact with the one surface of the PBA 300 on which the shield cover seating groove 380 is formed, and the front end surface of the front end part 513 of the insertion end part 510*a* comes in direct contact with or is seated to be spaced apart for a predetermined distance from the bottom surface of the shield cover seating groove 380, the assembly tolerance between the components can be absorbed, and the signal shielding role that is the original function can be easily performed.

In particular, in relation to the function of absorbing the assembly tolerance between the components, in case of manufacturing the shield cover 500 in a casting method, or in case of processing and forming the shield cover seating groove 380 on the PBA 300, the assembly tolerance problem may occur between both components within a predetermined range, and this means that the insertion depth of the front end surface of the front end part 513 of the insertion end part 510*a* is set to be at least smaller than the depth of the shield cover seating groove 380.

That is, as for the assembly tolerance absorption, since the protrusion length of the front end part 513 of the insertion end part 510*a* is set to be smaller than the depth of the shield cover seating groove 380, the front end surface of the insertion end part 510*a* of the shield cover 500 according to the first embodiment becomes spaced apart from the inner surface of the shield cover seating groove 380 while the front end of the shield cover wall 511 comes in contact with and is locked in the one surface of the PBA 300, and thus the fine assembly tolerance occurring during the manufacturing of the shield cover 500 can be absorbed within the range of the separation distance.

In this case, since the front end (i.e., stepped surface) of the shield cover wall 511 comes in close contact with the one surface of the PBA 300 corresponding to the outside of the shield cover seating groove 380, the above-described signal shielding role can be executed.

Meanwhile, as referenced in FIGS. 11 and 12, the insertion end part 510*b* of the shield cover 500 according to the second embodiment may include a front end part 513 formed to be inclined so that the width thereof becomes gradually narrowed from the end part of the shield cover wall 511 of the shield cover 500 toward the one surface of the PBA 300, and on the point that only the end part surface (front end surface) of the front end part 513 is inserted and comes in close contact with the inner surface of the shield cover seating groove 380, and the side part (outer surface) is formed to be inclined so that the width thereof becomes larger than the formation width of the shield cover seating groove 380 as it becomes spaced apart from the shield cover seating groove 380 as described above, only a part thereof may be locked in the upper end of the shield cover seating groove 380 or may be spaced apart from the upper end of the shield cover seating groove 380.

More specifically, since the shield cover wall 511 corresponding to the side part of the shield cover 500 according to the second embodiment is provided in a gradient form as described above, the front end surface of the front end part 513 of the insertion end part 510*b* comes in contact with the inner surface of the shield cover seating groove 380, and the shield cover wall 511 in the gradient form comes in contact with the shield cover seating groove 380 and the edge part formed by the one surface of the PBA 300 to perform a signal shielding role. This is the result in that the insertion end part 510*b* of the shield cover 500 according to the second embodiment is formed to extend to be inclined from the end part of the shield cover wall 511 to the front end part 513.

The signal shielding apparatus according to an embodiment of the present disclosure constituted as above enables the insertion end parts 510*a* and 510*b* of the shield cover 500 and the PBA 300 to firmly come in close contact with each other by an assembling force that is provided when the shield cover 500 is assembled to the PBA 300 by using a plurality of assembly screws (not illustrated) to prevent the signal leakage.

As described above, according to the signal shielding apparatus according to an embodiment of the present disclosure, unlike the related art, since the insertion end part 510*a* according to the first embodiment or the insertion end part 510*b* according to the second embodiment of the shield cover 500 is directly coupled so as to come in contact with the PBA 300, not according to a dispensing process when the shield cover 500 is coupled to the one surface of the PBA 300, the heat generated from the heating elements mounted on the PBA 300 can be easily transferred through the PBA 300, and can be transferred to both the one surface and the other surface of the PBA 300 for the heat dissipation.

That is, in the related art, in order to couple the shield cover 500 to the one surface of the PBA 300, a dispensing process is performed through the medium of a predetermined adhesive material, and from the viewpoint of high thermal resistance caused by the adhesive material between the PBA 300 and the shield cover 500, heat dissipation only to the side of the other surface of the PBA 300 becomes possible. However, the signal shielding apparatus according to an embodiment of the present disclosure can perform heat dissipation through both the one surface and the other surface of the PBA 300.

However, it is preferable that a film is formed on the insertion end parts 510*a* and 510*b* of the shield cover 500, the outer surface of the shield cover wall 511, and the inner surface of the shield cover seating groove 380, with any one of a material facilitating electromagnetic wave blocking or a thermally conductive material having prominent thermal conductivity so as to make the heat dissipation possible.

Meanwhile, since the insertion end part 510*a* of the shield cover 500 according to the first embodiment and the insertion end part 510*b* of the shield cover 500 according to the second embodiment are formed to correspond to the shape of the shield cover wall 511 as described above, they can perform the function of blocking the interferences of electromagnetic waves and/or signals being generated from components (e.g., RF feeding network related components mounted on one surface of the PBA 300) requiring the EMI shielding inside a plurality of lattice type closed loop shapes formed by the shield cover wall 511.

According to the antenna apparatus 1 according to an embodiment of the present disclosure as described above, by integrally forming the insertion end parts 510*a* and 510*b* that are inserted and seated onto the shield cover seating groove 380 formed on one surface of the PBA 300 with the front end part of the shield cover 500, the antenna apparatus can be easily assembled to perform the EMI shielding function smoothly even without a separate dispensing process, and also can prevent the manufacturing cost of the product from being increased.

For reference, the reference numeral 390 of FIG. 7 may be a connection connector provided for an electrical connection with other signal-related components (e.g., filter module 400 of FIGS. 4A to 5B).

As above, a signal shielding apparatus and an antenna apparatus including the same according to an embodiment of the present disclosure have been described in detail. However, embodiments of the present disclosure are not necessarily limited to the above-described embodiment, but it will be apparent that various modifications and implementation within an equal scope are possible by those of ordinary skill in the art to which the present disclosure pertains. Accordingly, the true scope of the present disclosure should be interpreted by the appended claims.

INDUSTRIAL APPLICABILITY

The present disclosure provides a signal shielding apparatus and an antenna apparatus including the same, which can greatly improve the heat dissipation performance by preventing an increase of the manufacturing cost, including a shield cover that facilitates EMI shielding, deleting a dispensing process that mediates an adhesive material, and securing a blocked heat dissipation path by the adhesive material.

The invention claimed is:

1. A signal shielding apparatus comprising:

a shield cover stacked and disposed on one surface of a printed board assembly (PBA) having one surface on which a plurality of signal-related components are mounted, and configured to prevent leakage of signals from the plurality of signal-related components, wherein a grooved shield cover seating groove is formed on one surface of the PBA, and wherein an insertion end part inserted and seated onto the shield cover seating groove is integrally formed on the other surface of the shield cover having one surface and the other surface, the other surface of the shield cover facing the one surface of the PBA, wherein the insertion end part has a front end whose surface is supported by the shield cover seating groove, and a side part is formed to be inclined so that the side part becomes larger than a formation width of the shield cover seating groove as being spaced apart from a bottom surface of the shield cover seating groove.

2. The signal shielding apparatus of claim 1, wherein the insertion end part is formed with a step height so that the entire insertion end part is accommodated in a groove shape of the shield cover seating groove.

3. The signal shielding apparatus of claim 2, wherein the front end surface of the insertion end part is spaced apart for a predetermined distance from the bottom surface of the shield cover seating groove when a region formed with the step height comes in contact with an outer surface of the shield cover seating groove.

4. The signal shielding apparatus of claim 1, wherein the shield cover seating groove and the insertion end part of the shield cover are formed in a closed loop shape so as to surround constituent elements requiring EMI shielding therein.

5. The signal shielding apparatus of claim 4, wherein the constituent elements requiring the EMI shielding comprise amplification-related elements and RF feeding related components coupled to the PBA.

6. The signal shielding apparatus of claim 1, wherein an inner surface of the shield cover seating groove is covered by any one of a material facilitating electromagnetic wave blocking or a thermally conductive material.

7. The signal shielding apparatus of claim 1, wherein the insertion end part of the shield cover is formed to correspond to a shape of a shield cover wall formed to reinforce the shield cover.

8. The signal shielding apparatus of claim 7, wherein the insertion end part of the shield cover and an outer surface of the shield cover wall are covered by any one of a material facilitating electromagnetic wave blocking or a thermally conductive material.

9. The signal shielding apparatus of claim 1, wherein the shield cover seating groove is formed to have a horizontal cross section corresponding to a shape of a shield cover wall formed to reinforce the shield cover.

10. The signal shielding apparatus of claim 1, wherein the shield cover seating groove is formed to have a "⊏"-shaped cross section.

11. A signal shielding apparatus comprising:

a shield cover stacked and disposed on one surface of a printed board assembly (PBA) having one surface on which a plurality of signal-related components are mounted, and configured to prevent leakage of signals from the plurality of signal-related components, wherein a grooved shield cover seating groove is formed on one surface of the PBA, and wherein an insertion end part inserted and seated onto the shield cover seating groove is integrally formed on the other surface of the shield cover having one surface and the other surface, the other surface of the shield cover facing the one surface of the PBA, wherein the insertion end part is formed to extend for a predetermined length from the other surface of the shield cover toward the bottom surface of the shield cover seating groove.

12. An antenna apparatus comprising:

an antenna housing part formed in a cuboidal enclosure shape having an open front;

a printed board assembly (PBA) stacked and disposed in an inner space of the antenna housing part;

a filter module stacked and disposed in front of the PBA; and a radiation element module stacked and disposed in front of the filter module, wherein a shield cover stacked and disposed on one surface of the PBA on which a plurality of signal-related components are mounted and configured to prevent leakage of signals from the plurality of signal-related components is further provided between the PBA and the filter module, and wherein an insertion end part inserted and seated onto a shield cover seating groove formed on one surface of the PBA in a groove shape is integrally formed on the other surface of the shield cover having the one surface and the other surface, the other surface of the shield cover facing the one surface of the PBA.

13. The antenna apparatus of claim 12, wherein the insertion end part has a front end whose surface is supported by the shield cover seating groove, and a side part is formed to be inclined so that the side part becomes larger than a formation width of the shield cover seating groove as being spaced apart from a bottom surface of the shield cover seating groove.

14. The antenna apparatus of claim 12, wherein the insertion end part is formed to extend for a predetermined length from the other surface of the shield cover toward a bottom surface of the shield cover seating groove.

15. The antenna apparatus of claim 12, wherein the shield cover seating groove is formed to have a "⊏"-shaped cross section.

16. The antenna apparatus of claim 12, wherein the insertion end part is formed with a step height so that the entire insertion end part is accommodated in a groove shape of the shield cover seating groove, and wherein a front end surface of the insertion end part is spaced apart for a predetermined distance from a bottom surface of the shield cover seating groove when a region formed with the step height comes in contact with an outer surface of the shield cover seating groove.

17. The antenna apparatus of claim 12, wherein the shield cover seating groove and the insertion end part of the shield cover are formed in a closed loop shape so as to surround constituent elements requiring EMI shielding therein, and wherein the constituent elements requiring the EMI shielding comprise amplification-related elements and RF feeding related components coupled to the PBA.

18. The antenna apparatus of claim 12, wherein an inner surface of the shield cover seating groove is covered by any one of a material facilitating electromagnetic wave blocking or a thermally conductive material.

19. The antenna apparatus of claim 12, wherein the insertion end part of the shield cover is formed to correspond to a shape of a shield cover wall formed to reinforce the shield cover, and wherein the insertion end part of the shield cover and an outer surface of the shield cover wall are covered by any one of a material facilitating electromagnetic wave blocking or a thermally conductive material.

20. The antenna apparatus of claim 12, wherein the shield cover seating groove is formed to have a horizontal cross section corresponding to a shape of a shield cover wall formed to reinforce the shield cover.

* * * * *